US011664694B2

(12) United States Patent
Iijima et al.

(10) Patent No.: US 11,664,694 B2
(45) Date of Patent: May 30, 2023

(54) MOTOR ROTOR

(71) Applicant: IHI Corporation, Tokyo (JP)

(72) Inventors: Kai Iijima, Tokyo (JP); Hikaru Sugiura, Tokyo (JP); Yuji Sasaki, Tokyo (JP); Tatsuya Fukui, Tokyo (JP); Yoshihito Katsu, Tokyo (JP); Ryosuke Yumoto, Tokyo (JP)

( * ) Notice: Subject to any disclaimer, the term of this patent is extended or adjusted under 35 U.S.C. 154(b) by 130 days.

(21) Appl. No.: 17/491,560

(22) Filed: Oct. 1, 2021

(65) Prior Publication Data

US 2022/0021255 A1 Jan. 20, 2022

Related U.S. Application Data

(63) Continuation of application No. PCT/JP2020/013110, filed on Mar. 24, 2020.

(30) Foreign Application Priority Data

Apr. 10, 2019 (JP) .............................. JP2019-074828

(51) Int. Cl.
| | |
|---|---|
| *H02K 1/30* | (2006.01) |
| *H02K 1/27* | (2022.01) |
| *H02K 7/18* | (2006.01) |
| *F02C 3/02* | (2006.01) |
| *H02K 1/2733* | (2022.01) |

(52) U.S. Cl.
CPC ............. *H02K 1/30* (2013.01); *F02C 3/02* (2013.01); *H02K 1/2733* (2013.01); *H02K 7/1823* (2013.01); *F05D 2220/40* (2013.01)

(58) Field of Classification Search
CPC ...... H02K 1/30; H02K 1/2733; H02K 7/1823; H02K 7/14; F02C 3/02; F02C 6/12; F05D 2220/40; F05D 2220/76
See application file for complete search history.

(56) References Cited

U.S. PATENT DOCUMENTS

| 2,488,729 A | 11/1949 | Kooyman |
|---|---|---|
| 2007/0052310 A1 | 3/2007 | Sakai et al. |

(Continued)

FOREIGN PATENT DOCUMENTS

| JP | S61-065839 | 5/1986 |
|---|---|---|
| JP | H2-094444 | 7/1990 |

(Continued)

OTHER PUBLICATIONS

International Preliminary Report on Patentability with Written Opinion dated Oct. 21, 2021 for PCT/JP2020/013110.

(Continued)

*Primary Examiner* — Joseph Ortega
(74) *Attorney, Agent, or Firm* — Soei Patent & Law Firm

(57) ABSTRACT

A motor rotor includes an inner sleeve, a cylindrical permanent magnet disposed around the inner sleeve, and a resin portion formed by charging a gap between the inner sleeve and the permanent magnet with a resin. The inner sleeve includes a small diameter portion. The small diameter portion is located to face an inner peripheral surface of an end portion of the permanent magnet in an axial direction. The small diameter portion is formed to have a diameter smaller than a diameter of a portion facing an inner peripheral surface of a center portion of the permanent magnet in the axial direction.

20 Claims, 6 Drawing Sheets

(56) References Cited

U.S. PATENT DOCUMENTS

| | | | |
|---|---|---|---|
| 2007/0065314 A1 | 3/2007 | Nagata et al. | |
| 2007/0065315 A1 | 3/2007 | Nagata et al. | |
| 2007/0086905 A1 | 4/2007 | Nagata et al. | |
| 2008/0084125 A1 | 4/2008 | Ohkawa et al. | |
| 2011/0273037 A1 | 11/2011 | Ota et al. | |
| 2013/0076199 A1 | 3/2013 | Yamagishi | |
| 2015/0118044 A1* | 4/2015 | Hippen | F01D 15/10 415/229 |

FOREIGN PATENT DOCUMENTS

| | | |
|---|---|---|
| JP | H10-014147 | 1/1998 |
| JP | 2000-014062 | 1/2000 |
| JP | 2002-010545 | 1/2002 |
| JP | 2005-198447 | 7/2005 |
| JP | 2006-197713 | 7/2006 |
| JP | 2007-159191 | 6/2007 |
| JP | 2011-239546 | 11/2011 |
| JP | 2013-074736 | 4/2013 |
| JP | 2016-208724 | 12/2016 |
| JP | 2018-050461 | 3/2018 |
| WO | 2012/089470 | 7/2012 |

OTHER PUBLICATIONS

International Search Report dated Jun. 30, 2020 for PCT/JP2020/013110.

* cited by examiner

MOTOR ROTOR

CROSS-REFERENCE TO RELATED APPLICATION

This application is a continuation application of PCT Application No. PCT/JP2020/013110, filed Mar. 24, 2020, the entire contents of which are incorporated herein by reference.

BACKGROUND

Hitherto, a motor rotor with a cylindrical magnet disposed around a shaft portion is known, for example Japanese Unexamined Patent Publication No. 2016-208724, Japanese Unexamined Patent Publication No. 2000-014062, Japanese Unexamined Patent Publication No. 2005-198447 etc. As a method of manufacturing this kind of motor rotor, a method of fixing the cylindrical magnet to the shaft portion by adhering is known.

SUMMARY

A motor rotor according to an aspect of the present disclosure includes a shaft portion; a cylindrical magnet disposed around the shaft portion; and a resin portion formed by charging a gap between the shaft portion and the magnet with a resin. The shaft portion is located to face an inner peripheral surface of an end portion of the magnet in an axial direction. The shaft portion includes a small diameter portion formed to have a diameter smaller than a diameter of a portion facing an inner peripheral surface of a center portion of the magnet in the axial direction.

DETAILED DESCRIPTION

As described in for example Japanese Unexamined Patent Publication No. 2016-208724 etc., according to the method of fixing the cylindrical magnet to the shaft portion by adhering, the shaft portion and the cylindrical magnet are aligned relatively satisfactorily. However, in order to obtain a good adhesion state between the shaft portion and the cylindrical magnet, it requires a troublesome grinding work that the inner peripheral surface of the cylindrical magnet is subjected to grinding to adjust the dimension first, and then the cylindrical magnet is adhered to the shaft portion. The present disclosure describes a motor rotor configured to align the shaft portion and the magnet. The structure of the motor rotor for aligning described herein is not more complicated than conventional motor rotors and the method of aligning described herein may comprise fewer alignment steps than conventional motor rotors.

A motor rotor according to an aspect of the present disclosure includes a shaft portion; a cylindrical magnet disposed around the shaft portion; and a resin portion formed by charging a gap between the shaft portion and the magnet with a resin, wherein the shaft portion is located to face an inner peripheral surface of an end portion of the magnet in an axial direction and includes a small diameter portion formed to have a diameter smaller than that of a portion facing an inner peripheral surface of a center portion of the magnet in the axial direction.

An outer peripheral surface of the shaft portion may be provided with a groove extending in a direction including a circumferential component. The small diameter portion may be a tapered portion that is formed to gradually decrease in diameter as the small diameter portion tapers away from the center portion of the magnet in the axial direction. The small diameter portion may be formed with a small diameter due to a step between the small diameter portion and a portion facing the center portion of the magnet.

Figure 1:
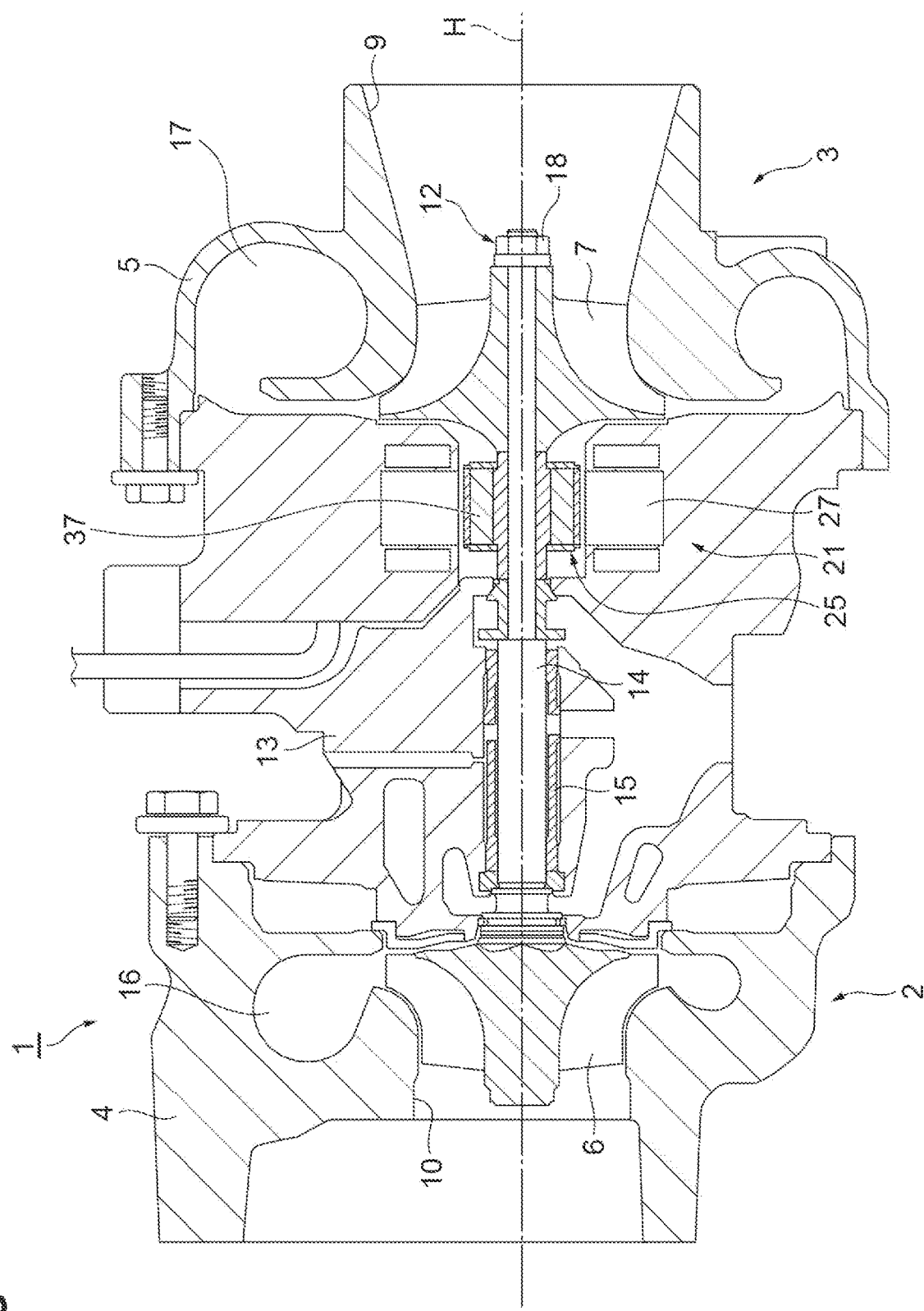
FIG. 1 is a cross-sectional view illustrating an example of a turbocharger to which a motor rotor according to an example is applied.

A motor rotor according to an example will be described with reference to the drawings. FIG. 1 is a cross-sectional view of a turbocharger 1 including a rotation axis H. The turbocharger 1 is a vehicle turbocharger including a motor rotor according to an example. In the following description, when the "axial direction", the "radial direction", and the "circumferential direction" are simply mentioned, these directions respectively mean the axial direction, the radial direction, and the circumferential direction of a rotation shaft 14 to be described below.

The turbocharger 1 is applied to an internal combustion engine of a vehicle or the like. As illustrated in FIG. 1, the turbocharger 1 includes a turbine 2 and a compressor 3. The turbine 2 includes a turbine housing 4 and a turbine impeller 6 accommodated in the turbine housing 4. The turbine housing 4 includes a scroll flow passage 16 extending in the circumferential direction around the turbine impeller 6. The compressor 3 includes a compressor housing 5 and a compressor impeller 7 accommodated in the compressor housing 5. The compressor housing 5 includes a scroll flow passage 17 extending in the circumferential direction around the compressor impeller 7.

The turbine impeller 6 is provided at one end of the rotation shaft 14 and the compressor impeller 7 is provided at the other end of the rotation shaft 14. A bearing housing 13 is provided between the turbine housing 4 and the compressor housing 5. The rotation shaft 14 is rotatably supported by the bearing housing 13 through a bearing 15 and the rotation shaft 14, the turbine impeller 6, and the compressor impeller 7 rotate around the rotation axis H as an integral rotation body 12.

The turbine housing 4 is provided with an exhaust gas inlet (not illustrated) and an exhaust gas outlet 10. An exhaust gas discharged from an internal combustion engine (not illustrated) flows into the turbine housing 4 through the exhaust gas inlet. Then, the exhaust gas flows into the turbine impeller 6 through the scroll flow passage 16 to rotate the turbine impeller 6. Then, the exhaust gas flows to the outside of the turbine housing 4 through the exhaust gas outlet 10.

The compressor housing 5 is provided with a suction port 9 and a discharge port (not illustrated). When the turbine impeller 6 rotates as described above, the compressor impeller 7 rotates through the rotation shaft 14. The rotating compressor impeller 7 sucks external air through the suction port 9. This air passes through the compressor impeller 7 and the scroll flow passage 17 to be compressed and is discharged from the discharge port. The compressed air discharged from the discharge port is supplied to the above-described internal combustion engine.

Further, the turbocharger 1 includes an electric motor 21. When the torque of the rotation shaft 14 is insufficient, for example at the time of accelerating the vehicle, the electric motor 21 applies a torque to the rotation shaft 14 to make up for the shortage. The electric motor 21 is, for example, a brushless DC electric motor. The electric motor 21 includes a motor rotor 25 which is a rotor and a motor stator 27 which is a stator. A battery of the vehicle can be used as a drive source of the electric motor 21. Further, the electric motor 21 may regeneratively generate electricity by the rotational energy of the rotation body 12 at the time of decelerating the vehicle. The electric motor 21 has a characteristic corresponding to the high-speed rotation (for example, 100,000 to 200,000 rpm) of the rotation shaft 14.

The motor rotor 25 is disposed between the bearing 15 and the compressor impeller 7 in the axial direction. The motor rotor 25 is fixed to the rotation shaft 14 and is rotatable together with the rotation shaft 14. The motor stator 27 is accommodated in the bearing housing 13 and is disposed to surround the motor rotor 25 in the circumferential direction. The motor stator 27 includes a plurality of coils and iron cores (not illustrated). When a current is supplied to the coil to generate a magnetic field by the motor stator 27, a circumferential force is applied to a permanent magnet 37 of the motor rotor 25 due to the magnetic field. As a result, a torque is applied to the rotation shaft 14.

Figure 2:
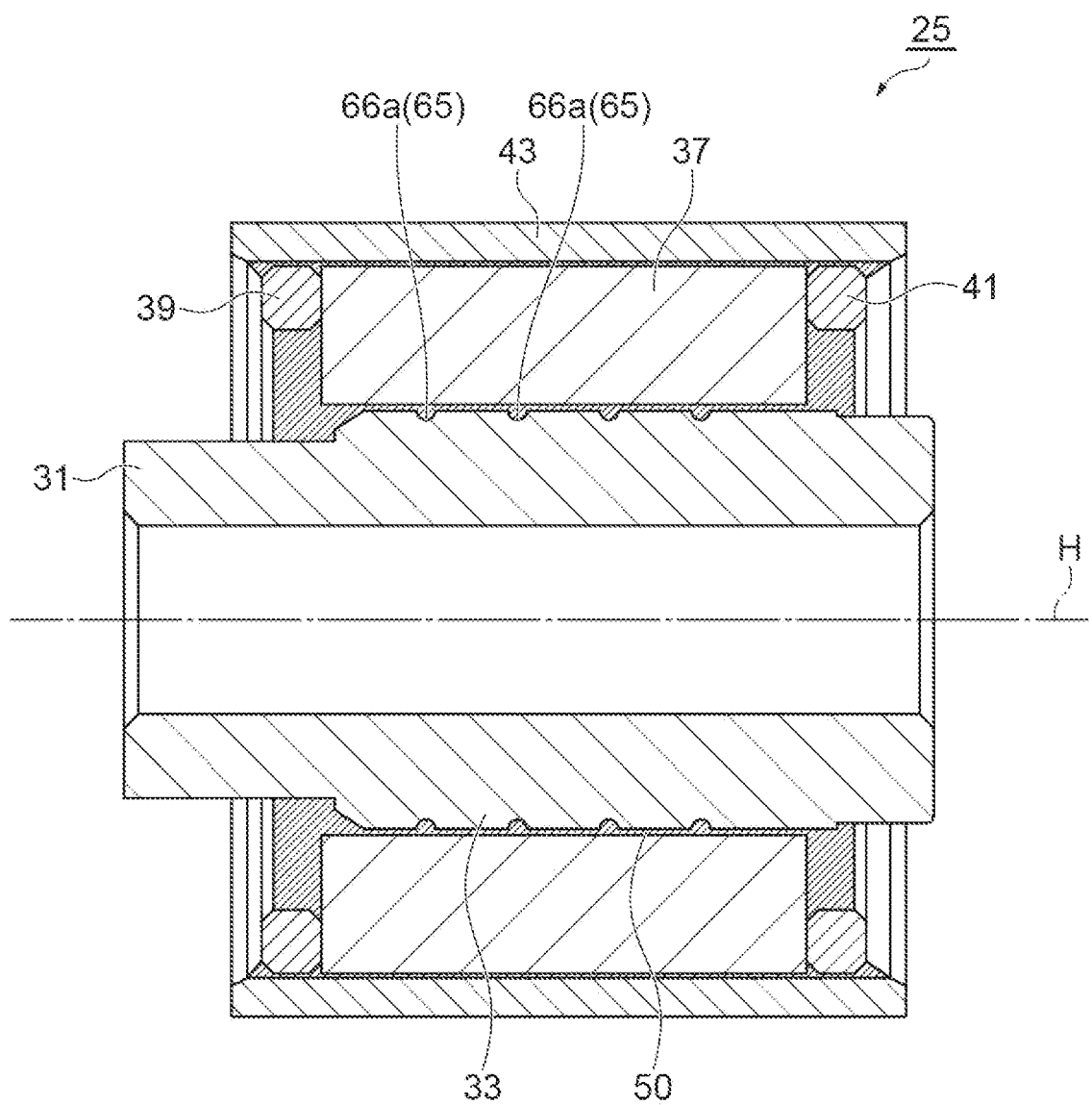
FIG. 2 is a cross-sectional view of the motor rotor.

Next, the motor rotor 25 will be described with reference to FIG. 2. The motor rotor 25 is an assembly which includes an inner sleeve 31, a permanent magnet 37, end rings 39 and 41, a protective layer 43, and a resin portion 50. The inner sleeve 31, the permanent magnet 37, the end rings 39 and 41, the protective layer 43, and the resin portion 50 are formed in a rotation body shape with the rotation axis H as a center axis.

The inner sleeve 31 includes a large diameter portion 33. The large diameter portion 33 is provided with a slightly large diameter at the center portion of the inner sleeve 31 in the axial direction. The permanent magnet 37 is formed in a cylindrical shape and is installed around the large diameter portion 33. The protective layer 43 is a cylindrical member and is sometimes called an "armor ring" or the like. The protective layer 43 is formed in a cylindrical shape and is installed around the permanent magnet 37. The protective layer 43 prevents debris from scattering in the radial direction when the permanent magnet 37 is damaged. Further, the protective layer 43 needs to have a certain degree of rigidity in order to suppress the strain of the permanent magnet 37 and reduce the possibility of damage to the permanent magnet 37.

A slight gap exists between the inner sleeve 31 (shaft portion) and the permanent magnet 37. The gap is charged with a resin material of the resin portion 50. For example, the resin portion 50 is formed by injection-molding or transfer-molding. The inner sleeve 31 and the permanent magnet 37 are integrally connected through the resin portion 50. Then, the torque can be transmitted between the inner sleeve 31 and the permanent magnet 37 by the resin portion 50. The torque transmitted in the turbocharger 1 is, for example, about 0.5 Nm.

Additionally, the permanent magnet 37 and the protective layer 43 may be connected to each other by charging a gap between the permanent magnet 37 and the protective layer 43 with a resin. In addition, the end rings 39 and 41 may be also connected to the inner sleeve 31 and the protective layer 43 through the charged resin portion.

As described above, the motor rotor 25 is an integral assembly. The rotation shaft 14 is inserted through the hollow portion of the inner sleeve 31 of the motor rotor 25 and the motor rotor 25 and the compressor impeller 7 are fastened to the rotation shaft 14 together by a nut 18 (see FIG. 1).

As the material of the inner sleeve 31, for example, a steel material such as SCM435H can be adopted. As the material of the permanent magnet 37, for example, a neodymium magnet (Nd—Fe—B), a samarium cobalt magnet, or the like can be adopted. As the material of the protective layer 43, a metal material or a resin material can be adopted. As the metal material, a non-magnetic metal such as titanium (for example, Ti-6Al-4V) can be adopted. Further, as the resin material, carbon fiber reinforced plastic (CFRP) etc. can be adopted. As the materials of the end rings 39 and 41, for example, a non-magnetic metal such as SUS, a thermosetting resin, a thermoplastic resin, or the like can be adopted.

As the material of the resin portion 50, a thermosetting resin, a thermoplastic resin, or the like can be adopted. More specifically, phenol resin or epoxy resin which is a thermosetting resin or liquid crystal polymer (LCP) which is a thermoplastic resin can be adopted as the material of the resin portion 50. Additionally, according to the tests conducted by the present inventors, LCP is may be adopted as a material for the resin portion 50 in that it has higher fluidity during injection-molding than phenol resin. Further, LCP may be adopted as a material for the resin portion 50 in that it is relatively easy to obtain as compared with phenol resin. On the other hand, the phenol resin may be adopted as the material of the resin portion 50 in that it is superior in heat resistance, rigidity, and environmental resistance as compared with LCP. Further, the epoxy resin may be adopted as the material of the resin portion 50 because the material itself has adhesiveness.

Figure 3:
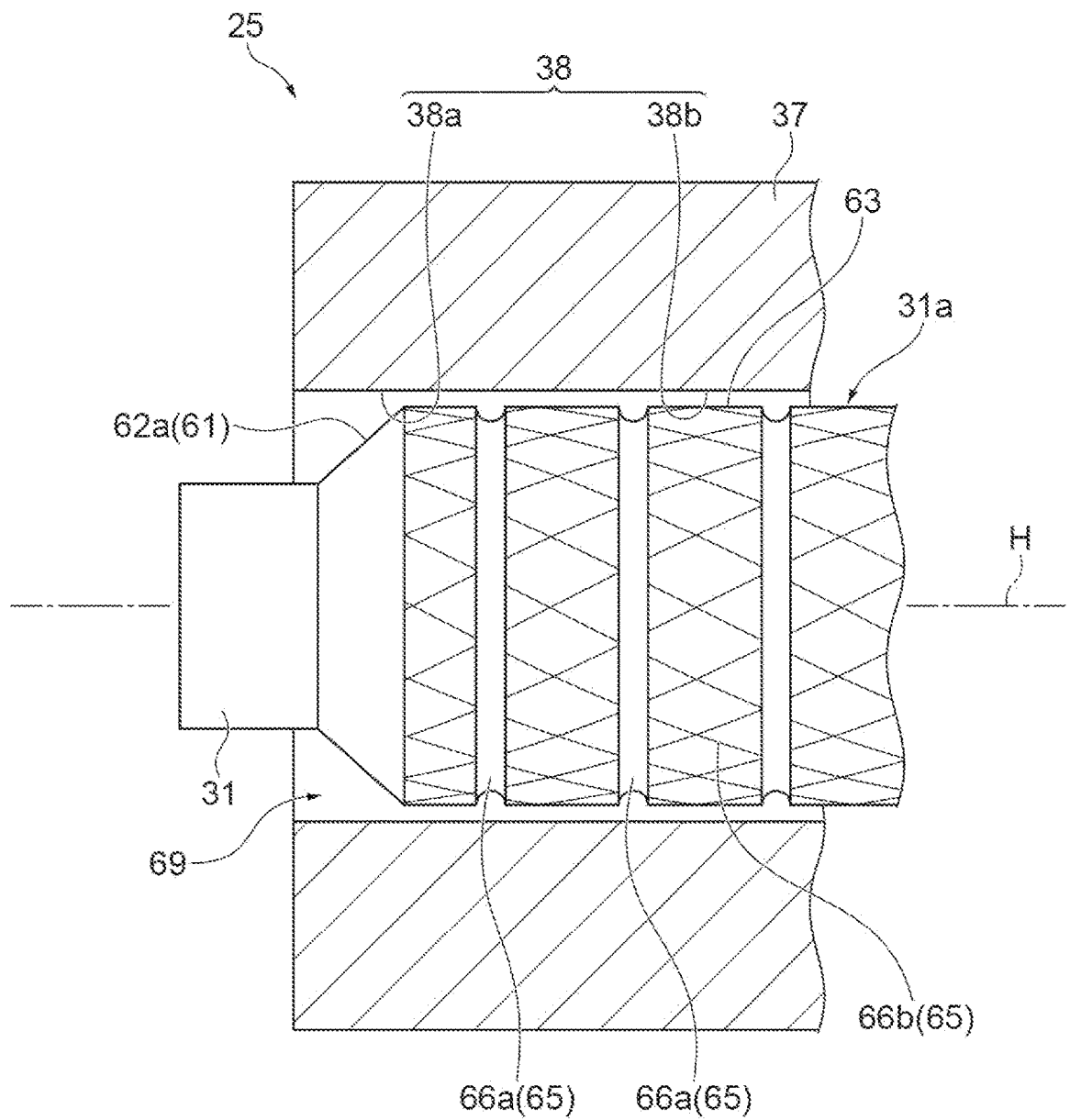
FIG. 3 is a side view illustrating an inner sleeve and a permanent magnet.

FIG. 3 is a side view only illustrating the inner sleeve 31 and the permanent magnet 37 in the motor rotor 25. In addition, in FIG. 3, the feature portion according to the description is exaggerated and depicted and the dimensional ratio of each portion may not match with other drawings.

As illustrated in FIG. 3, the inner peripheral surface 38 of the permanent magnet 37 is a cylindrical inner peripheral surface. Hereinafter, in the inner peripheral surface 38, an inner peripheral surface of the end portion of the permanent magnet 37 in the axial direction is called an inner peripheral surface 38a and an inner peripheral surface of the center portion of the permanent magnet 37 in the axial direction is called an inner peripheral surface 38b. The inner sleeve 31 includes a small diameter portion 61. The small diameter portion 61 is formed at a position facing the inner peripheral surface 38a in the radial direction. The small diameter portion 61 is formed to have a diameter smaller than that of the center portion 63 of the inner sleeve 31. The center portion 63 is a portion facing the inner peripheral surface 38b of the permanent magnet 37.

Figure 4:
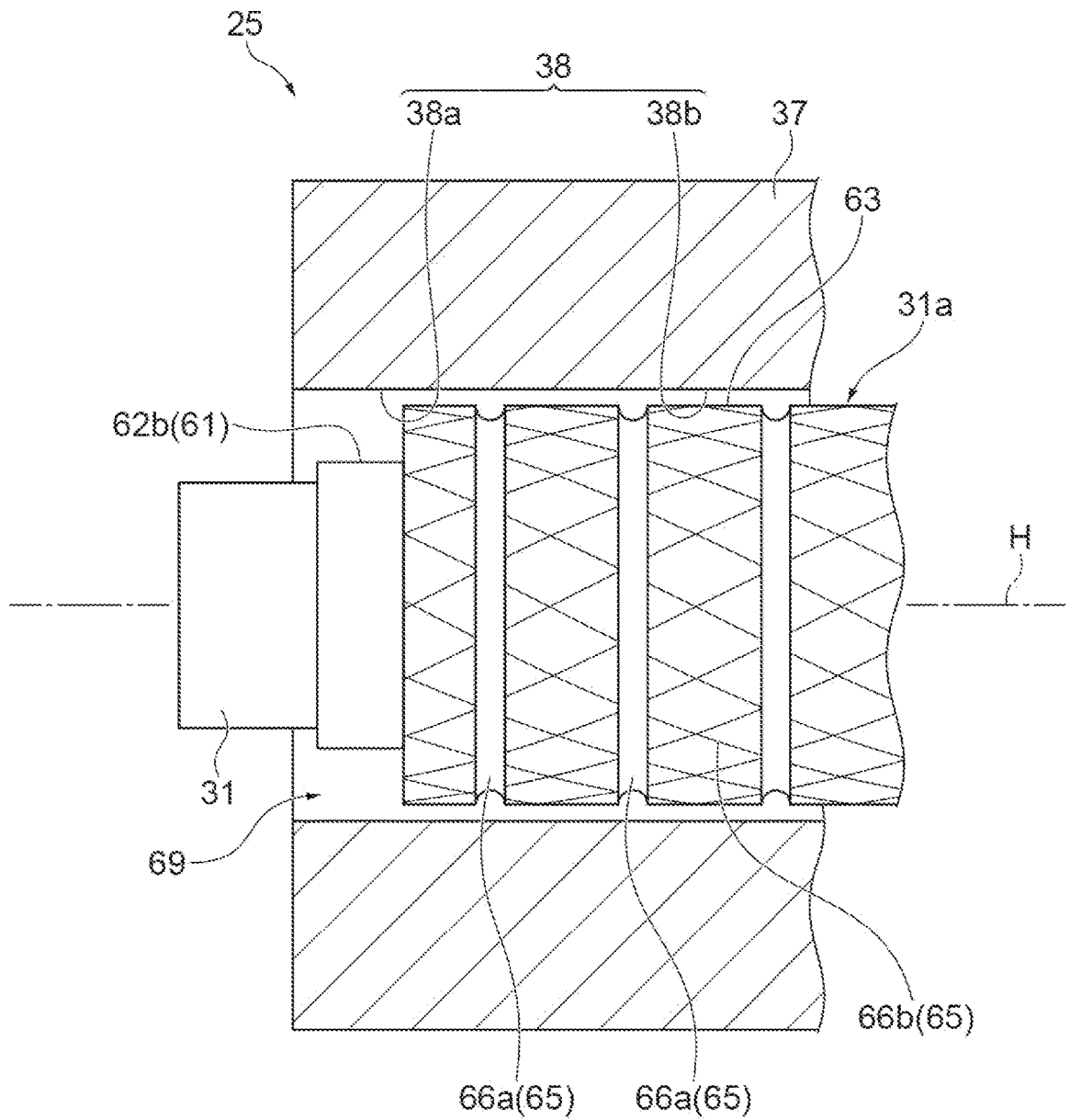
FIG. 4 is a side view illustrating an inner sleeve and a permanent magnet of another example.

In the example of FIG. 3, the small diameter portion 61 is a tapered portion 62a. The tapered portion 62a is formed to gradually decrease in diameter as the tapered portion 62a tapers away from the center portion 63 in the axial direction. An outer peripheral surface of the tapered portion 62a forms a conical surface. Additionally, the small diameter portion 61 is not limited to the tapered portion 62a. For example, as illustrated in FIG. 4, the small diameter portion 61 may be a stepped small diameter portion 62b which is formed with a small diameter due to a step between the small diameter portion and the center portion 63. An outer peripheral surface of the step small diameter portion 62b forms a cylindrical surface.

Further, as illustrated in FIG. 3, an outer peripheral surface 31a of the inner sleeve 31 is provided with a groove 65 extending in a direction including a circumferential component. In the example of FIG. 3, the groove 65 includes a circumferential groove 66a and a knurled groove (twill knurled groove, crisscrossed knurled groove) 66b. The circumferential groove 66a extends in the circumferential direction on the outer peripheral surface 31a. The knurled groove 66b extends spirally in two directions intersecting each other on the outer peripheral surface 31a. In addition, as the groove 65, it is not essential that both the circumferential groove 66a and the knurled groove 66b are provided and only one of them may be provided. Further, instead of the knurled groove 66b, a knurled groove including a spiral groove extending in one direction may be adopted.

Figure 5:
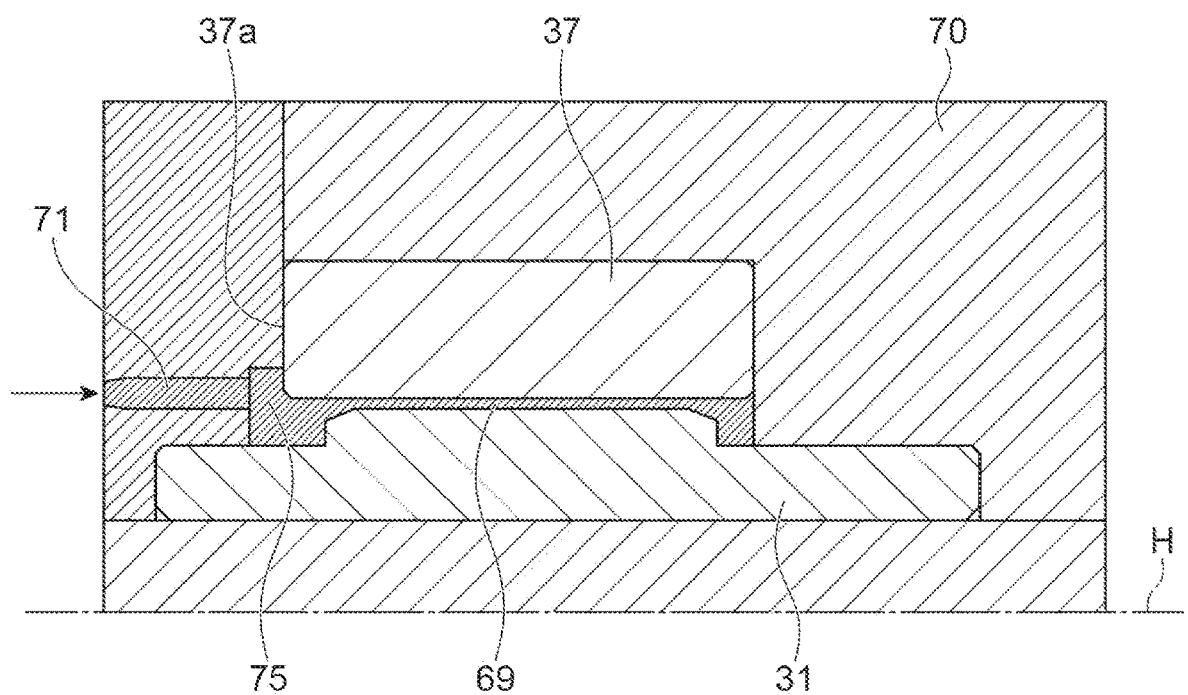
FIG. 5 is a cross-sectional view illustrating an example of a mold state when forming a resin portion by injection-molding.

FIG. 5 is a cross-sectional view illustrating an example of a state of a mold 70 when forming the resin portion 50 by injection-molding. As illustrated in FIG. 5, the mold 70 accommodates the inner sleeve 31 and the permanent magnet 37. The permanent magnet 37 is disposed around the inner sleeve 31. A gap 69 exists between the inner sleeve 31 and the permanent magnet 37. When a molten resin 71 is injected from the left side of the mold 70 in the axial direction, the molten resin 71 is charged into the gap 69 while flowing to the right side of the gap 69. This molten resin 71 is cured so that the resin portion 50 is formed.

Figure 6:
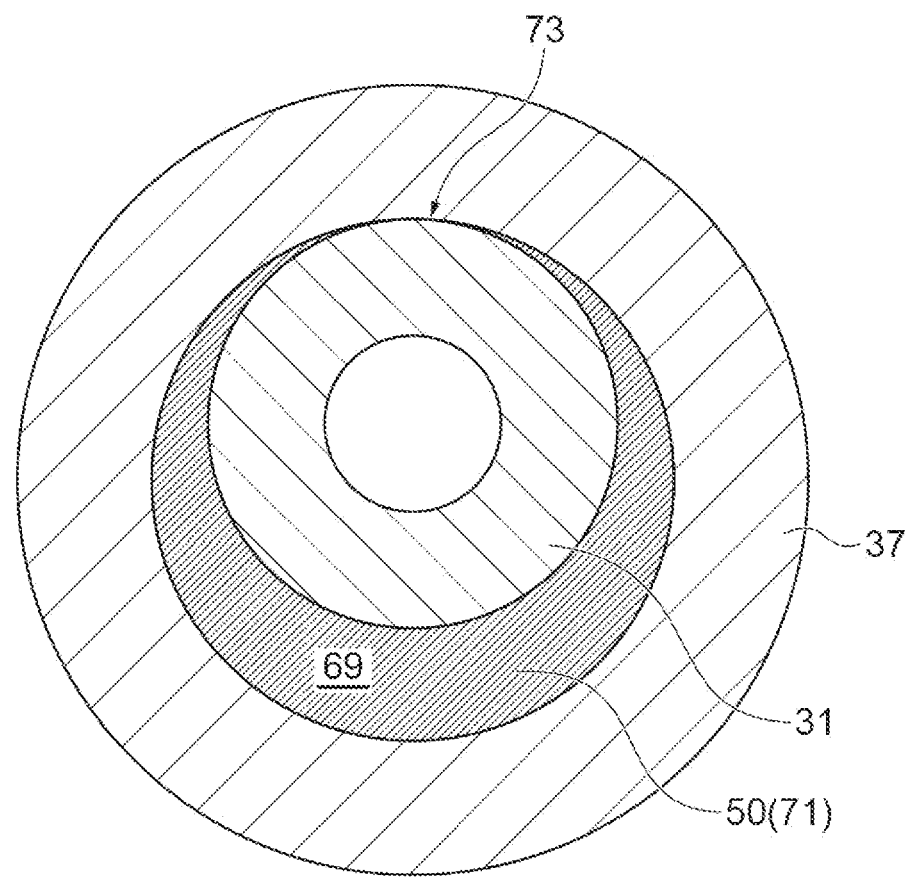
FIG. 6 is a cross-sectional view illustrating a state in which the inner sleeve and the permanent magnet are misaligned.

Here, when the molten resin 71 is introduced into the gap 69, there is concern that the flow state of the molten resin 71 may become non-uniform in the circumferential direction. Then, as illustrated in FIG. 6, there is concern that the molten resin 71 may be cured while the inner sleeve 31 and the permanent magnet 37 are misaligned. In this case, there is a possibility that the resin may not spread to a portion where the gap 69 is narrowed (Reference Numeral 73 in the drawing) which results in a defect. Then, the defect may cause the peeling of the resin portion 50.

In contrast, as illustrated in FIGS. 3 and 4, the inner sleeve 31 includes the small diameter portion 61. Accordingly, the gap 69 spreads in the radial direction at the position of the end portion of the permanent magnet 37 which is the inlet of the molten resin 71. According to this structure, since the gap between the small diameter portion 61 and the inner peripheral surface 38a is relatively wide, the injection speed of the molten resin 71 in the gap is relatively slow. Thus, the molten resin 71 is likely to spread in the entire circumferential direction in the gap between the small diameter portion 61 and the inner peripheral surface 38a. Then, the molten resin 71 spreads in the entire circumferential direction and flows in the axial direction to be charged into the gap 69. In this way, the molten resin 71 is likely to uniformly spread in the circumferential direction in the gap 69 when the inlet of the molten resin 71 to the gap 69 is widened. As a result, the inner sleeve 31 and the permanent magnet 37 are aligned.

As described above, according to the structure of the motor rotor 25 of this example, the inner sleeve 31 and the permanent magnet 37 are aligned according to a structure in which the small diameter portion 61 is provided in the inner sleeve 31.

Further, the groove 65 formed in the outer peripheral surface 31a of the inner sleeve 31 extends in the direction including the circumferential component. Accordingly, the groove 65 guides the flow of the molten resin 71 in the direction including the circumferential component. Thus, the groove 65 promotes the flow of the molten resin 71 in the circumferential direction inside the gap 69. Thus, the molten resin 71 is likely to uniformly spread in the circumferential direction in the gap 69 also by the existence of the groove 65. Further, as illustrated in FIG. 5, a space 75 is formed between a left end surface 37a of the permanent magnet 37 and the mold 70 during injection-molding. This space 75 functions as a resin pool and spreads the molten resin 71 in the circumferential direction. Thus, the flow of the molten resin 71 in the circumferential direction in the gap 69 is further promoted.

Further, since the resin portion 50 is formed to enter the groove 65, the adhesiveness between the resin portion 50 and the inner sleeve 31 is increased and the adhesiveness between the inner sleeve 31 and the permanent magnet 37 is also increased. Since the groove 65 extends in the direction including the circumferential component, the adhesiveness in the axial direction is increased. As a result, the misalignment of the permanent magnet 37 with respect to the inner sleeve 31 in the axial direction is suppressed. Further, since the groove 65 includes the knurled groove 66b, the misalignment of the permanent magnet 37 with respect to the inner sleeve 31 in the circumferential direction is also suppressed.

The present disclosure can be carried out in various forms having various modifications and improvements based on the knowledge of those skilled in the art, including the above-described examples. Further, it is also possible to construct a modified example by utilizing the technical matters described in the above-described examples. The configurations of the respective examples may be combined and used as appropriate.

In the example, a connection between the inner sleeve 31 having a hollow structure and the permanent magnet 37 has been described, but the above-described structure can be applied, for example, even when the permanent magnet 37 is connected to the shaft portion having a solid structure.

The invention claimed is:
1. A motor rotor comprising:
an inner sleeve;
a cylindrical magnet disposed around the inner sleeve; and
a resin portion formed by charging a gap between the inner sleeve and the magnet with a resin,
wherein the inner sleeve comprises:
a large diameter portion which is located to face an inner peripheral surface of a center portion of the magnet in an axial direction; and
a small diameter portion which is located to face an inner peripheral surface of an end portion of the magnet in the axial direction and is formed to have a diameter smaller than a diameter of the large diameter portion.
2. The motor rotor according to claim 1,
wherein the small diameter portion comprises a tapered portion that is formed to gradually decrease in diameter as the small diameter portion tapers away from the large diameter portion in the axial direction.
3. The motor rotor according to claim 2,
wherein an outer peripheral surface of the tapered portion forms a conical surface.
4. The motor rotor according to claim 1,
wherein the small diameter portion is formed with a small diameter due to a step between the small diameter portion and the large diameter portion.

5. The motor rotor according to claim 4,
wherein the small diameter portion comprises a stepped portion that abruptly decreases in diameter due to the step between the small diameter portion and the large diameter portion.

6. The motor rotor according to claim 5,
wherein an outer peripheral surface of the stepped portion forms a cylindrical surface.

7. The motor rotor according to claim 1,
wherein an outer peripheral surface of the inner sleeve is provided with a circumferential groove extending in a direction including a circumferential component.

8. The motor rotor according to claim 7,
wherein the circumferential groove is provided on an outer peripheral surface of the large diameter portion.

9. The motor rotor according to claim 8,
wherein a plurality of the circumferential grooves is provided on the outer peripheral surface of the large diameter portion.

10. The motor rotor according to claim 1,
wherein an outer peripheral surface of the inner sleeve is provided with a knurled groove extending spirally on the outer peripheral surface of the inner sleeve.

11. The motor rotor according to claim 10,
wherein the knurled groove is provided on an outer peripheral surface of the large diameter portion.

12. The motor rotor according to claim 1,
wherein an outer peripheral surface of the inner sleeve is provided with a knurled groove extending spirally in two directions intersecting each other on the outer peripheral surface of the inner sleeve.

13. The motor rotor according to claim 1,
further comprising a cylindrical protective layer disposed around the magnet, and
wherein the protective layer and the magnet are connected to each other by charging a gap between the protective layer and the magnet with the resin.

14. The motor rotor according to claim 13,
further comprising an end ring located between the inner sleeve and the protective layer in a circumferential direction, and
wherein the end ring is connected to the inner sleeve and the protective layer by charging a gap among the end ring, the inner sleeve and the protective layer.

15. The motor rotor according to claim 14,
further comprising two end rings,
wherein the magnet is provided between the two end rings in the axial direction, and
wherein the two end rings are connected to the inner sleeve, the protective layer and the magnet by charging a gap among the two end rings, the inner sleeve, the protective layer and the magnet.

16. The motor rotor according to claim 14,
wherein the inner sleeve, the magnet, the protective layer, the end ring and the resin forms a rotation body as an integral assembly.

17. The motor rotor according to claim 1,
wherein the resin includes a liquid crystal polymer.

18. The motor rotor according to claim 1,
wherein the resin includes a phenol resin.

19. The motor rotor according to claim 1,
wherein the resin includes an epoxy resin.

20. A turbocharger comprising:
a turbine housing accommodating a turbine impeller provided at one end of a rotation shaft;
a compressor housing accommodating a compressor impeller provided at the other end of a rotation shaft;
a bearing housing provided between the turbine housing and the compressor housing; and
a motor rotor comprising:
an inner sleeve, wherein the rotation shaft is inserted through a hollow portion of the inner sleeve;
a cylindrical magnet disposed around the inner sleeve; and
a resin portion formed by charging a gap between the inner sleeve and the magnet with a resin,
wherein the inner sleeve comprises:
a large diameter portion which is located to face an inner peripheral surface of a center portion of the magnet in an axial direction; and
a small diameter portion which is located to face an inner peripheral surface of an end portion of the magnet in the axial direction and is formed to have a diameter smaller than a diameter of the large diameter portion.

* * * * *